US012348614B2

(12) United States Patent
Chamorro et al.

(10) Patent No.: US 12,348,614 B2
(45) Date of Patent: *Jul. 1, 2025

(54) DISTRIBUTED KEY MANAGEMENT SYSTEM WITH A KEY LOOKUP SERVICE

(71) Applicant: CLOUDFLARE, INC., San Francisco, CA (US)

(72) Inventors: Derek Chamorro, Austin, TX (US); Michael Pak, Denver, CO (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,124

(22) Filed: Feb. 5, 2024

(65) Prior Publication Data

US 2024/0396713 A1 Nov. 28, 2024

Related U.S. Application Data

(63) Continuation of application No. 18/322,265, filed on May 23, 2023, now Pat. No. 11,895,227.

(51) Int. Cl.
H04L 9/08 (2006.01)

(52) U.S. Cl.
CPC .......... *H04L 9/0825* (2013.01); *H04L 9/0827* (2013.01)

(58) Field of Classification Search
CPC .............................. H04L 9/0825; H04L 9/0827
See application file for complete search history.

(56) References Cited

U.S. PATENT DOCUMENTS

| 7,823,190 B1 * | 10/2010 | Kacarov ............... H04L 9/3226 380/278 |
| 9,817,675 B1 * | 11/2017 | Katchapalayam ........ H04L 9/14 |
| 10,326,597 B1 | 6/2019 | Roth et al. |
| 11,658,812 B1 * | 5/2023 | Chamorro ............. H04L 9/0897 380/279 |
| 2009/0092252 A1 * | 4/2009 | Noll ........................ H04L 9/083 380/277 |

(Continued)

FOREIGN PATENT DOCUMENTS

| CN | 103107889 A * | 5/2013 | |
| WO | WO-2020114377 A1 * | 6/2020 | ........... H04L 9/0825 |

OTHER PUBLICATIONS

Non-Final Office Action, U.S. Appl. No. 17/956,689, Dec. 1, 2022, 6 pages.

(Continued)

*Primary Examiner* — Darshan I Dhruv
(74) *Attorney, Agent, or Firm* — NICHOLSON DE VOS WEBSTER & ELLIOTT LLP

(57) ABSTRACT

A first intermediate key management system (KMS) server of a distributed KMS receives a key lookup service (KLS) query from a KMS client for determining an identity of KMS server(s) that are capable of performing a first operation with a first managed key. The first intermediate KMS server is one of the intermediate KMS servers of the distributed KMS. The first KMS server determines the identity of one or more of the KMS servers that are capable of performing the first operation with the first managed key. The first KMS server transmits a KLS response to the KMS client that includes the identity of the KMS server(s) that are capable of performing the first operation with the first managed key.

21 Claims, 8 Drawing Sheets

(56) References Cited

U.S. PATENT DOCUMENTS

| | | | |
|---|---|---|---|
| 2013/0031255 A1* | 1/2013 | Maloy | H04L 61/3015 |
| | | | 709/226 |
| 2016/0253515 A1 | 9/2016 | Damgrd et al. | |
| 2016/0269370 A1 | 9/2016 | White et al. | |
| 2016/0316006 A1 | 10/2016 | Zhang et al. | |
| 2017/0085374 A1* | 3/2017 | Chen | H04L 9/083 |
| 2018/0048464 A1* | 2/2018 | Lim | H04L 63/0442 |
| 2018/0115587 A1* | 4/2018 | Roth | H04L 63/20 |
| 2019/0342079 A1* | 11/2019 | Rudzitis | G06F 21/602 |
| 2019/0372758 A1* | 12/2019 | Tevosyan | H04L 9/0891 |
| 2019/0394024 A1 | 12/2019 | Vepa et al. | |
| 2021/0028931 A1* | 1/2021 | Ng | H04L 9/085 |
| 2022/0069983 A1* | 3/2022 | Yoshida | H04L 9/12 |
| 2022/0123920 A1* | 4/2022 | Pike | H04L 9/083 |
| 2022/0240083 A1* | 7/2022 | Goel | H04W 12/069 |

OTHER PUBLICATIONS

Non-Final Office Action, U.S. Appl. No. 18/321,694, May 13, 2024, 7 pages.
Non-Final Office Action, U.S. Appl. No. 18/322,265, Aug. 3, 2023, 38 pages.
Notice of Allowance, U.S. Appl. No. 17/956,689, Jan. 13, 2023, 8 pages.
Notice of Allowance, U.S. Appl. No. 18/322,265, Nov. 21, 2023, 34 pages.
Final Office Action, U.S. Appl. No. 18/321,694, Sep. 5, 2024, 12 pages.

* cited by examiner

DISTRIBUTED KEY MANAGEMENT SYSTEM WITH A KEY LOOKUP SERVICE

CROSS-REFERENCE TO RELATED APPLICATIONS

This application is a continuation of application Ser. No. 18/322,265, filed May 23, 2023, which is hereby incorporated by reference.

FIELD

Embodiments of the invention relate to the field of networking; and more specifically, to a distributed key management system with a key lookup service.

BACKGROUND

A key management system (KMS) is used to manage cryptographic keys. A KMS can manage the lifecycle of cryptographic keys (e.g., key creation, key rotation, key import/export, key replication), manage cryptographic operations using cryptographic keys (e.g., encrypting, decrypting, signing, verifying), manage access (e.g., key access, permission granting, revocation, and/or manage administration (e.g., user/configuration management, key usage logging, monitoring configuration, audit functions). Conventionally, a KMS is provided as a central server and has a one-to-one relationship with its clients. That is, a client interacts with a specific KMS.

SUMMARY

A first intermediate key management system (KMS) server of a distributed KMS receives a key lookup service (KLS) query from a KMS client for determining an identity of one or more key management system (KMS) servers that are capable of performing a first operation with a first managed key. The first intermediate KMS server is of the intermediate KMS servers of the distributed KMS. The first intermediate KMS server determines the identity of the one or more KMS servers that are capable of performing the first operation with the first managed key. The first intermediate KMS server transmits a KLS response to the KMS client that includes the identity of the one or more KMS servers that are capable of performing the first operation with the first managed key. The KMS client transmits a KMS service request to one or more of the identified KMS servers to perform the key operation.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
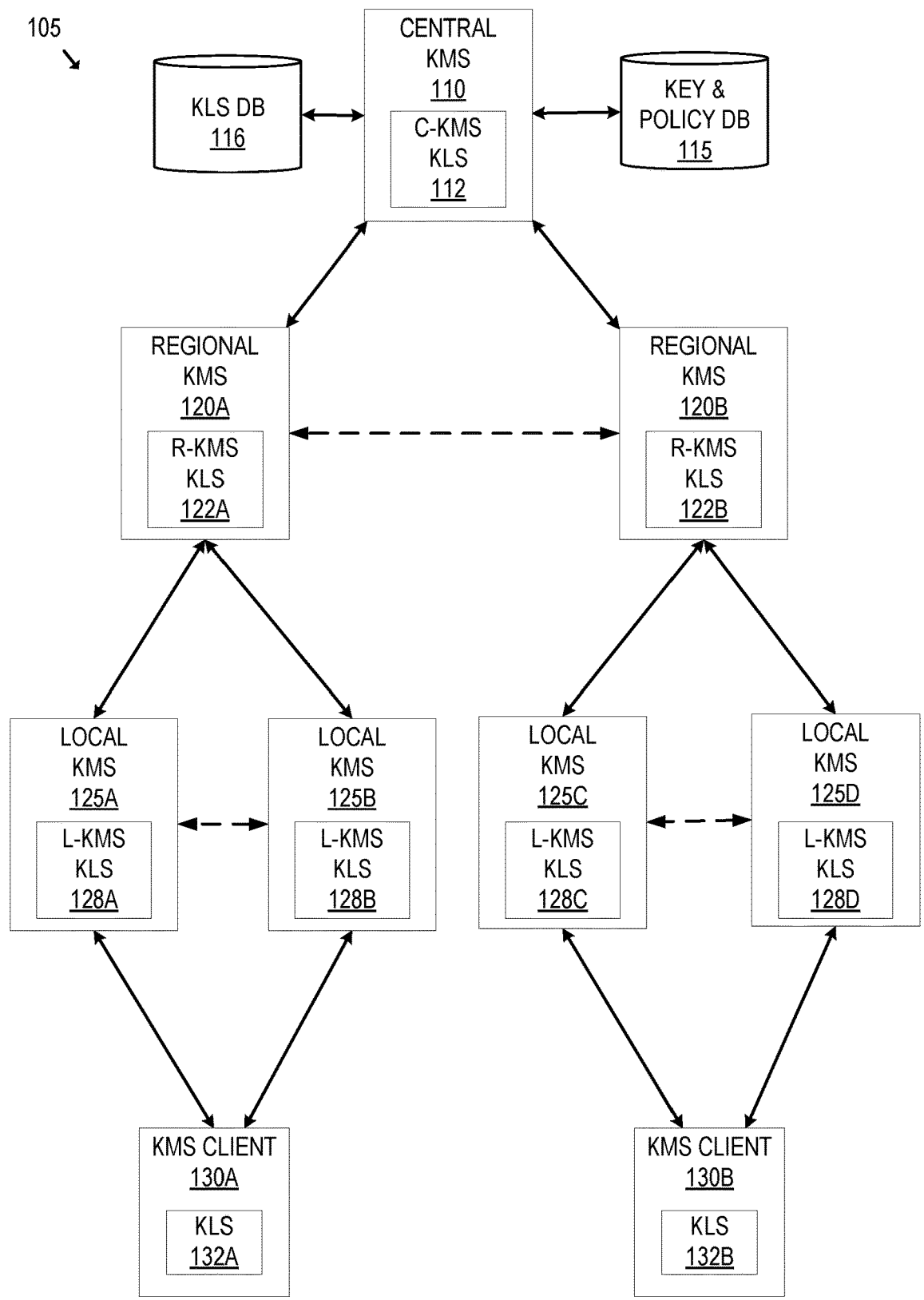
FIG. 1 shows an exemplary distributed KMS with a KLS according to an embodiment.

A distributed key management system (KMS) with a key lookup service (KLS) is described. The distributed KMS includes a central KMS server and multiple tiers of intermediate KMS servers. As an example, a first tier of KMS servers is sometimes referred herein as regional KMS servers, and a second tier of KMS servers is sometimes referred herein as local KMS servers. The KLS provides a system for determining the location of a managed key and associated policy. For example, based on an identifier of a managed key, the KLS system can return the identity of a KMS server that is capable of performing a key operation with that managed key.

A KLS record may include a key identifier, key attribute(s), key capability, an access policy, and a list of KMS server(s). The key identifier uniquely identifies a key. The key attribute(s) may include metadata including: lifecycle status (e.g., active, paused, use not allowed, deleted); type (e.g., AES, RSA, EC); date(s) (e.g., creation date, last rotation date, deletion date); and/or location(s) (e.g., usage and/or storage geography restrictions). The key capability includes a list of lifecycle and cryptographic functions that can be performed using the key. The access policy defines access based on one or more attributes including identity, IP address, and protocol. For example, an identity (e.g., a user, a group, an application) may be granted permission to use a managed key (e.g., encrypt, decrypt) with one or more optional conditions (e.g., protocol type, host IP address, location (e.g., host geographic location or region), time and/or date (e.g., time of the day, day of the week, date range). The list of KMS server(s) includes a list of available KMS servers with supported capabilities (e.g., a server IP address and/or URL of a KMS server, and a list of cryptographic function(s) that are provided by the KMS for that key).

In practice, a KMS client can query the KLS given a specified key and/or key operation (e.g., given a key A, perform operation X with A). The KLS query can be transmitted to a set of one or more predefined servers to perform the KLS. The KLS returns the identity of one or more KMS servers that are each capable of performing the key operation with that managed key. Using this same example, the KLS returns the identity of a KMS server that, given the key A, can perform operation X with A. Such KMS servers can be identified with an IP address and/or URL, as an example. The KMS servers may be returned in a rank order that denotes an estimated response/transaction time among the KMS servers.

The central KMS server centrally manages the lifecycle, access, cryptographic operation, and administration of managed keys and associated policies. The central KMS server periodically replicates at least selective ones of the managed keys and associated policies to a first tier of KMS servers. The first tier of KMS servers periodically replicate at least selective ones of the managed keys and associated policies to a second tier of KMS servers. The periodic replication of the managed keys and associated policies may repeat across subsequent tiers of KMS servers. The central KMS server may also periodically replicate KLS records to a first tier of KMS servers, and the first tier of KMS servers may periodically replicate KLS records to a second tier of KMS servers, and so on.

Each KMS server can provide a key service to a KMS client such as encrypting a data key, decrypting a data key, signing, verifying, creating a data key, creating a data key pair, and/or generating a random number. The second tier of KMS servers (sometimes known as local KMS servers) are geographically distributed to be closer to KMS clients to improve response time.

Conventional key management systems are provided with a central server. Such a central server may not be located near all the clients it serves and thus performance can be slow. Unlike these conventional systems, embodiments describe a distributed KMS that includes multiple KMS servers that are capable of servicing KMS clients, which may be closer to the KMS clients. This increases performance by reducing the time for the requests and responses to traverse the network.

Conventional key management systems also have a one-to-one relationship with the central server and its clients. That is, a client can only make a request to a single central KMS server. Unlike these conventional systems, the KMS client can transmit a KMS service request to one or more intermediate KMS servers, which improves resiliency and scalability.

Further, an intermediate KMS server can receive managed keys, KLS records, and/or updated policies from another intermediate KMS server instead of, or in addition to, the central KMS server. This improves resiliency.

FIG. 1 shows an exemplary distributed KMS with a KLS according to an embodiment. The system 105 includes the central KMS server 110, the regional KMSs 120A-B, the local KMSs 125A-D, and the KMS clients 130A-B. Although FIG. 1 shows a single central KMS server 110, in an embodiment there are multiple central KMSs (e.g., a primary central KMS and one or more backup central KMSs). Although FIG. 1 shows two tiers of intermediate KMS servers (a regional KMS tier and local KMS tier), in other embodiments there can be more than two tiers of intermediate KMS servers.

The central KMS server 110 centrally manages the lifecycle, access, operation, and administration of managed keys and associated policies. A managed key is a key that is administered via policy. As examples, the managed keys may be root key(s), primary key(s), and/or key encryption key(s) that are used to protect other keys (e.g., other key encryption keys and/or data encryption keys (data keys)). For instance, a managed key may be used to protect session keys while they are in storage, in use, and/or in transit. The managed keys may also be a public key pair used for digital signature generation and verification. Each managed key may be associated with a policy that is used to enforce fine-grained access control using one or more attributes such as identity (e.g., a specific user, a specific application), IP address, and/or protocol.

Lifecycle management may include managed key creation, managed key rotation, managed key deletion, managed key importing, managed key exporting, and/or managed key replication. Managed key creation may include creating a symmetric managed key that does not leave the central KMS server 110 in plaintext and/or creating an asymmetric managed key-pair where the private key does not leave the central KMS server 110 in plaintext. Managed key rotation may include periodically, or on-demand, rotating a managed key. Managed key deletion may include deleting a managed key after a specific time period or on-demand. Managed key importing may include creating a new managed key and/or rotating a managed key from imported encrypted key material and metadata. Managed key exporting may include exporting encrypted managed key material and metadata. Managed key replication may include replicating a managed key.

Cryptographic operation management may include encrypting data (e.g., a data encryption key) using a managed key, decrypting data (e.g., an encrypted data key) using a managed key, signing data (e.g., creating a digital signature of a message or message digest using a managed key), verifying a message signature, creating a data key, and/or creating a data key-pair.

Access management may include managed key access and/or function permission grant and/or revocation. For example, an identity (e.g., a user, a group, an application) may be granted permission to use a managed key (e.g., encrypt, decrypt) with one or more optional conditions (e.g., protocol type, host IP address, location (e.g., host geographic location or region), time and/or date (e.g., time of the day, day of the week, date range). Administration management may include user and configuration management, key usage logging and monitoring configuration, and/or audit functions.

The managed keys and associated policies are stored at the managed key and policy database 115. The managed key and policy database 115 may be stored in a hardware security module (HSM). Although FIG. 1 shows a single data structure that stores the key(s) and policy(ies), there may be multiple data structures that store this information (e.g., a database or other structure that stores managed keys and a separate database or other structure that stores policies).

The central KMS server 110 may act as the root authority for KLS records. For instance, the central KMS server 110 includes the central KMS KLS 112 to provide KLS functionality. Each KLS record can include a key identifier, key attribute(s), key capability, an access policy, and a list of KMS server(s). The key identifier uniquely identifies a key. The key attribute(s) may include metadata including: lifecycle status (e.g., active, paused, use not allowed, deleted); type (e.g., AES, RSA, EC); date(s) (e.g., creation date, last rotation date, deletion date); and/or location(s) (e.g., usage and/or storage geography restrictions). The key capability includes a list of lifecycle and cryptographic functions that can be performed using the key. The access policy defines access based on one or more attributes including identity, IP address, and protocol. For example, an identity (e.g., a user, a group, an application) may be granted permission to use a managed key (e.g., encrypt, decrypt) with one or more optional conditions (e.g., protocol type, host IP address, location (e.g., host geographic location or region), time and/or date (e.g., time of the day, day of the week, date range). The list of KMS server(s) includes a list of available KMS servers with supported capabilities (e.g., a server IP address and/or URL of a KMS server, and a list of cryptographic function(s) that are provided by the KMS for that key). The KLS records may be stored in the KLS database 116.

The central KMS server 110 is connected with the regional KMSs 120A-B. The number of regional KMSs 120 shown in FIG. 1 is exemplary; there may be additional regional KMS(s) connected to the central KMS server 110. The central KMS server 110 periodically replicates the managed keys and associated policies to the regional KMSs 120A-B. The same managed keys and associated policies may be replicated to each of the regional KMSs 120A-B. Alternatively, different managed keys and associated policies may be replicated to different ones of the regional KMSs 120A-B. The replication may be done on a scheduled interval and/or on-demand as needed.

The central KMS server 110 may also periodically replicate KLS records to the regional KMSs 120A-B. The same KLS records may be replicated to each of the regional KMSs 120A-B. Alternatively, different KLS records may be replicated to different ones of the regional KMSs 120A-B. The replication may be done on a scheduled interval and/or on-demand as needed.

The regional KMSs 120A-B store the managed keys and associated policies received from the central KMS server 110 and provide key operation services (e.g., encrypting, decrypting, signing, verifying, etc.) and potentially other key management services to endpoint systems. The regional KMSs 120A-B also store the KLS records received from the central KMS server 110 and provide key lookup services. For example, the regional KMS 120A and the regional KMS 120B include the regional KMS KLS 122A and the regional KMS KLS 122B respectively to provide key lookup services, which will be described in greater detail.

A regional KMS is connected to one or more local KMSs. As illustrated in FIG. 1, the regional KMS 120A is connected to the local KMS 125A and the local KMS 125B, and the regional KMS 120B is connected to the local KMS 125C and the local KMS 125D. The number of local KMS shown in FIG. 1 is exemplary; there may be additional local KMS(s) connected to each regional KMS. A regional KMS periodically replicates the managed keys and associated policies to the local KMS(s) to which it is connected. The regional KMS may also periodically replicate KLS records to the local KMS(s) to which it is connected. For instance, the regional KMS 120A periodically replicates the managed keys and associated policies, and KLS records, to the local KMS 125A and the local KMS 125B. Likewise, the regional KMS 120B periodically replicates the managed keys and associated policies, and KLS records, to the local KMS 125C and the local KMS 125D. The replication may be done on a scheduled interval and/or on-demand as needed.

In an embodiment, a regional KMS may receive managed keys and associated policies, and/or KLS records, from another regional KMS. For instance, the regional KMS 120A may receive a managed key, policy update, and/or a KLS record from the regional KMS 120B. This may occur, for example, when a regional KMS receives a non-scheduled replication of a managed key and associated policy, a KLS record, and/or policy update from the central KMS server 110.

A local KMS stores the managed keys, associated policies, KLS records received from a regional KMS. For example, the local KMS 125A and local KMS 125B store the managed keys, associated policies, and KLS records received from the regional KMS 120A. Likewise, the local KMS 125C and local KMS 125D store the managed keys, associated policies, and KLS records received from the regional KMS 120B. A local KMS provides key operation services (e.g., encrypting, decrypting, signing, verifying, etc.) and potentially other key management services for clients. The local KMS also provides key lookup services. For example, the local KMSs 125A-D include the local-KMS KLS 128A-D respectively to provide key lookup services.

The KMS clients 130A and 130B are clients of the distributed KMS service. As an example, a KMS client may be a compute server in a distributed cloud computing network. Such a compute server may process network traffic (e.g., HTTP/S requests/responses, SPDY requests/responses, or other network traffic) and may provide services including protecting against internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), and/or other services. Although two KMS clients are shown in FIG. 1, there can be many KMS clients that are clients of the distributed KMS service.

Each KMS client 130 includes a key lookup service (KLS) 132 for performing key lookups to determine the identity of a KMS server that is capable of performing a given operation using a given key. For example, the KMS clients 130A-B include the KLS 132A-B respectively. A KMS client 130 uses the KLS to transmit a query given a specified key and/or operation to determine the identity of a KMS server (e.g., one or more of the local KMSs and/or regional KMS) that is capable of servicing that request. For example, to determine which KMS server has that specified key and can perform the specified key operation.

The KMS client transmits the KLS query to a KLS server, which may be a local KMS. In an example, the KMS client 130 is configured with a primary KLS server and one or more secondary KLS servers. The primary KLS server may be the one that is closest to the KMS client 130 or otherwise is the one that can provide a result to the KMS client 130 the fastest under normal operating conditions. The primary KLS server may be part of the same datacenter as the KMS client. The secondary KLS server(s) may be chosen to be the next closest to the KMS client 130 or otherwise is the one that can provide an answer to the KMS client 130 the next fastest under normal operating conditions. As another example, the secondary KLS server(s) may be selected to prioritize route diversity. The KMS client 130 transmits the key service request to the primary service KMS first. If the primary KLS server is not available, or it is slow to respond (e.g., it does not respond within a time period), the KMS client 130 transmits the KLS query to a secondary KLS server.

In an example, the IP address that is used for the KLS server may be an anycast IP address that is shared among multiple KLS servers (e.g., multiple local KMSs). In such a case, the particular KLS server that receives the KLS query is closest to the KMS client in terms of routing protocol configuration (e.g., BGP configuration) according to an anycast implementation as determined by the network infrastructure (e.g., router(s), switch(es), and/or other network equipment between the KLS servers and the KMS client.

In another example, a KMS client 130 uses a load balancing algorithm when transmitting a KLS query to a KLS server (e.g., based on load of the KLS servers). In another example, a KMS client 130 uses a round-robin technique for transmitting a KLS query to at least a group of KLS servers.

As an example, the KMS client 130A transmits a KLS query to one or more of the local KMS 125A and 125B. If the local KMS 125 can answer the KLS query (e.g., it may have the KLS record stored or cached), the local KMS 125 transmits a KLS response to the KMS client that includes the identity of one or more KMS servers that are each capable of performing the requested service. The KMS that is identified as being capable of performing the requested service may be different from the KMS that answers the KLS query. As an example, the local KMS 125A may transmit a response that identifies the local KMS 125B as the KMS server that is capable of performing the requested service. If the local KMS 125 does not have information to answer the KLS query, that local KMS 125 may itself transmit the KLS query to a regional KMS.

If the regional KMS 120 can answer the KLS query (e.g., it has the KLS record stored or cached), the regional KMS 120 transmits a KLS response to the local KMS that includes the identity of one or more KMS servers that are each capable of performing the requested service. The local KMS transmits the KLS response to the KMS client. The local KMS may store or cache the KLS record that is returned from the regional KMS. If the regional KMS 120 does not have information to answer the KLS query, the regional KMS can itself transmit the KLS query to the central KMS server 110.

The central KMS server 110 transmits a response to the regional KMS with an answer to the KLS query. The answer can include the identity of one or more KMS servers that are each capable of performing the requested service. The regional KMS can store or cache the KLS record that is returned from the central KMS server 110. The regional KMS transmits the KLS response to the local KMS. The local KMS transmits the KLS response to the KMS client. The local KMS may store or cache the KLS record that is returned from the regional KMS.

Using the information returned from the KLS query, the KMS client 130 transmits a KMS service request to at least one of the identified KMS servers returned in the KLS query. The identified KMS server(s) may be a local KMS or a regional KMS. The KMS service request is a request related to a managed key of the distributed KMS. For example, the KMS service request may be a request to encrypt a data key, decrypt a data key, sign a message, verify a signed message, create a data key, create a data key pair, or generate a random number. A KMS service request includes the requested action (e.g., encrypt, decrypt, sign, verify, etc.), a key identifier that identifies a managed key to be used for the requested action, and may include the data on which the requested action is to be performed. The KMS service request may also include a subject identifier that identifies the subject identity associated with the KMS service request (e.g., a user, a group, an application, a system) and may include credential(s) of the subject identity. For instance, the subject identifier and credential may take the form of a user ID and password/API key. The KMS service request may also include additional information used to validate the subject identity and/or the request such as host information (e.g., IP address, OS version, patch status, device posture, etc.). The KMS client 130 can transmit a KMS service request to multiple identified KMS servers.

If the KMS that receives the KMS service request from the KMS client can perform the requested KMS service with a locally available key, that KMS service request performs the requested key operation and transmits a key service response to the KMS client 130. This is done without querying the central KMS server 110 or other KMS server. The key service response includes the result of the requested key operation. If, for example, the KMS service request is to decrypt an encrypted data key (unwrap a data key), the key service response includes the decrypted data key. If the KMS that receives the KMS service request from the KMS client does not have the key necessary to perform the requested key operation, that KMS queries the central KMS server 110 or a regional KMS for the key and associated policy. The KMS then performs the requested key operation using the queried key and transmits the key service response to the KMS client 130.

Although embodiments describe a single key service request being serviced by a single KMS, in another embodiment multiple KMSs are required to service a single key service request. For example, in an embodiment, a managed key is split according to a threshold cryptography system where a number n of KMSs from a group of m KMSs are required to use the managed key (e.g., decrypt). As an example, if the number n is 2 and the number m is 5, the KMS client 130 transmits a KMS service request to at least five KMSs.

Figure 2:
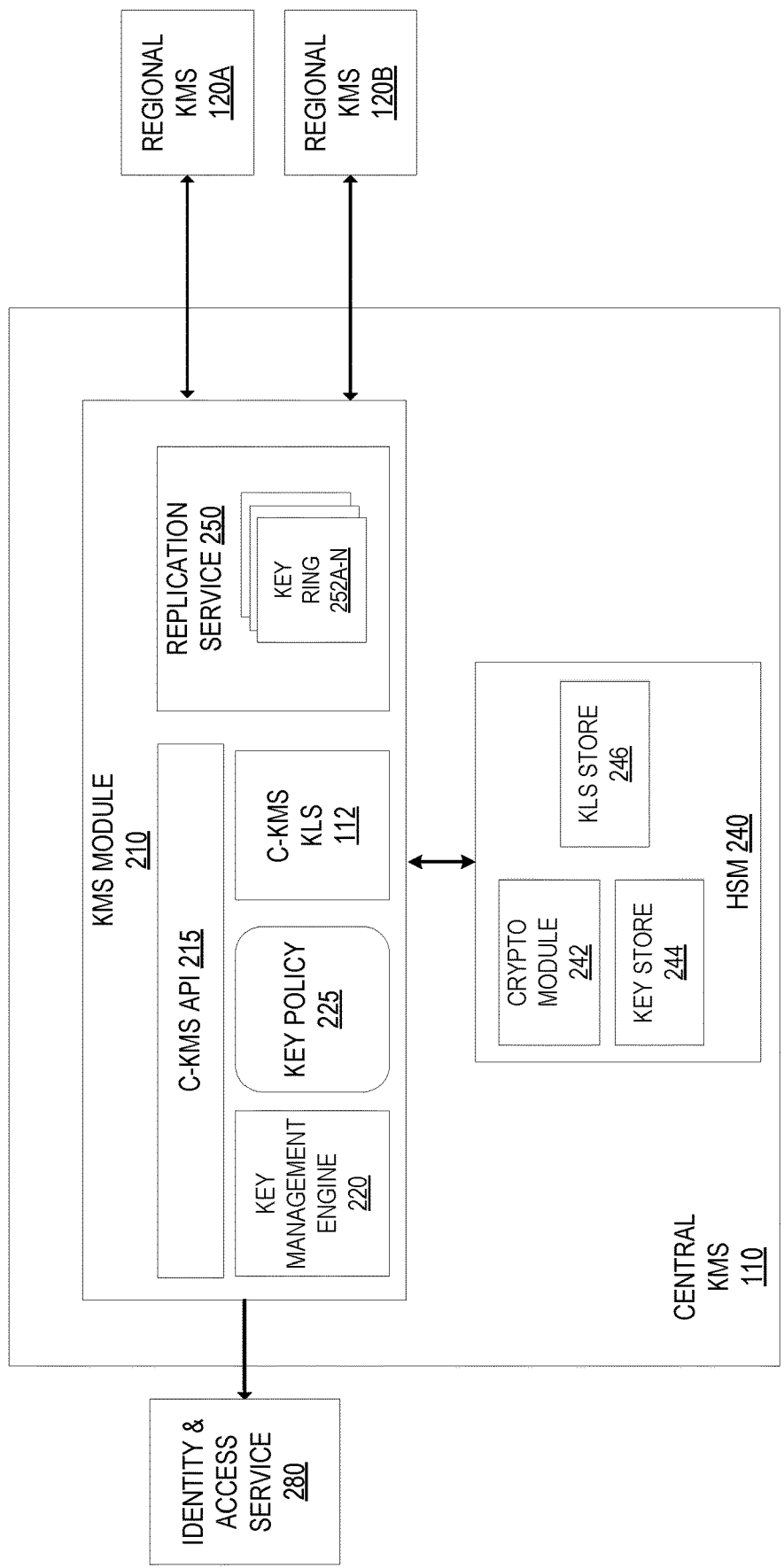
FIG. 2 shows an exemplary central KMS according to an embodiment.

FIG. 2 shows an exemplary central KMS according to an embodiment. In an embodiment, the central KMS server 110 is hosted on a system that includes a minimal set of kernel and userspace components required to support the management of key lifecycle, access, operation, and administration of managed keys and associated policies. The host system may use a hardware-based root-of-trust, Trusted Execution Environment (TEE). The central KMS server 110 includes the KMS module 210 and the hardware security module (HSM) 240.

The KMS module 210 includes the C-KMS API 215, the key management engine 220, the key policy store 225, the C-KMS KLS 112, and the replication service 250. The C-KMS API 215 provides an interface for the service KMS 120A-N to use the features and services provided by the central KMS server 110. For example, the C-KMS API 215 provides an interface for cryptographic functions using managed keys such as encrypting a data key, decrypting a data key, signing, verifying, creating a data key, creating a data key pair, and/or generating a random number. As another example, the C-KMS API 215 provides an interface for defining and/or updating a key policy for a managed key. As another example, the C-KMS API 215 provides an interface for querying the key lookup service.

The key policies are stored in the key policy store 225. Each managed key may be associated with its own policy to enforce fine-grained access control based on one or more attributes including identity, IP address, and protocol. For example, an identity (e.g., a user, a group, an application) may be granted permission to use a managed key (e.g., encrypt, decrypt) with one or more optional conditions (e.g., protocol type, host IP address, location (e.g., host geographic location or region), time and/or date (e.g., time of the day, day of the week, date range).

The HSM 240 includes the cryptographic module 242 that performs cryptographic operations using a managed key stored in the key store 244. The HSM 240 also includes KLS records stored in the KLS store 246. Although FIG. 2 shows the KLS records as being stored in the KLS store 246 within the HSM 240, in another example the KLS records are not stored within the HSM. For example, they may be stored outside of an HSM.

The central-KMS (C-KMS) KLS 112 responds to KLS queries with KLS records. The C-KMS KLS 112 may also include an interface to allow for the KLS records to be created. The C-KMS KLS 112 may also periodically replicate the KLS records to the regional KMSs or use the replication service 250 for replicating the KLS records.

The key replication service 250 prepares and serves managed key rings 252A-N (a collection of managed keys and policies) to the regional KMSs 120A-B. Each key ring 252 may be organized based on business and/or compliance requirements. Each key ring 252 is stored and protected using a managed key of the central KMS server 110. Each key ring 252 that is transmitted to a regional KMS 120 has a data encryption key (DEK) that is wrapped with a unique key of that regional KMS 120 (e.g., a public key of that regional KMS 120). The KMS module 210 uses the key replication service 250 to periodically replicate the managed keys and associated policies to the regional KMSs 120A-B. Although not shown in FIG. 2, there may be one or more applications running on the central KMS that are clients of the KMS module 210.

Figure 3:
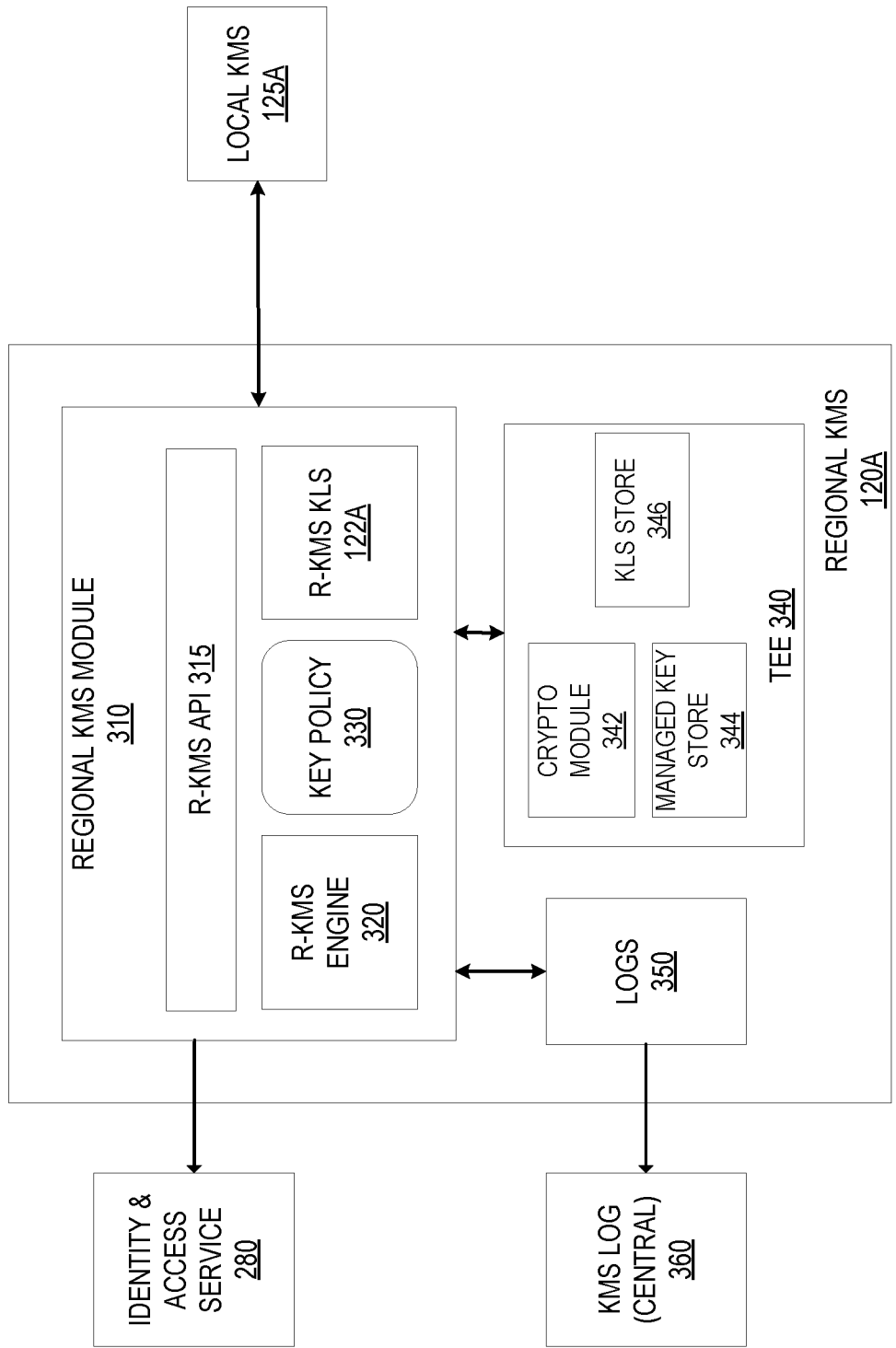
FIG. 3 shows an exemplary regional KMS according to an embodiment.

FIG. 3 shows an exemplary regional KMS 120A according to an embodiment. In an embodiment, the regional KMS 120A is hosted on a system that includes a minimal set of kernel and userspace components required to support the functions of the regional KMS 120A. The host system may use a hardware-based root-of-trust, Trusted Execution Environment (TEE). The regional KMS server 110 includes the regional KMS module 310, the TEE 340, and the logs 350. The regional KMS module 310 includes the R-KMS API 315, the R-KMS engine 320, the key policy 330, and the R-KMS KLS 122A.

The regional KMS module 310 receives the replicated managed keys and associated policies from the central KMS server 110. The replicated managed keys are stored in the managed key store 344 of the TEE 340. The KLS records are stored in the KLS store 346. The key policy 330 is protected by a managed key stored in the managed key store 344 in the TEE 340. The key policy 330 can define fine-grained access control for using a managed key for a key operation based on one or more attributes including identity, IP address, and protocol. For example, an identity (e.g., a user, a group, an application) may be granted permission to use a managed key (e.g., encrypt, decrypt) with one or more optional conditions (e.g., protocol type, host IP address, location (e.g., host geographic location or region), time and/or date (e.g., time of the day, day of the week, date range). The TEE 340 also includes the cryptographic module 342 that performs cryptographic operations using a managed key stored in the managed key store 344.

The R-KMS API 315 provides an interface for KMS clients to use the features and services provided by the regional KMS 120A. For example, the R-KMS API 315 provides an interface for cryptographic functions using managed keys such as encrypting, decrypting, signing, verifying, creating a data key, creating a data key pair, and/or generating a random number. The local KMS (e.g., local KMS 125A) may use the R-KMS API 315 to make a KMS service request. The connection between a local KMS and the regional KMS 120A may be over a secure connection (e.g., an mTLS connection). Further, the regional KMS 120A and the local KMS may authenticate each other using HW rooted of trust.

The R-KMS engine 320 controls the execution of the functions of the regional KMS 120A including and processing the KMS service requests received from a local KMS. If a KMS service request requires use of a managed key that is not locally available to the R-KMS engine 320 (e.g., the managed key is not included in the managed key store 344), the R-KMS engine 320 causes a query for the managed key and associated policy to be transmitted to the central KMS server 110. The managed key received from the central KMS server 110 is stored in the managed key store 344.

Processing a KMS service request may include enforcing the policy associated with the managed key that is necessary for the requested operation. For example, the R-KMS engine 320 checks a requested key action against a CMK policy to determine whether the requested action is permitted for the subject identity. To authenticate the subject identity, the R-KMS engine 320 may access the identity and access service 280 to authenticate the identity of the subject (e.g., a user, a group, an application, a system). If permitted, the R-KMS engine 320 causes the cryptographic module 342 to perform the requested cryptographic operation (e.g., encrypt, decrypt, sign, verify, create a data key, create a data key pair, generate a random number, etc.).

In an embodiment, the R-KMS engine 320 may cause a managed key and/or an associated policy to be transmitted to other regional KMSs 120. Further, the R-KMS engine 320 may receive and install a managed key and/or associated policy received from another regional KMS 120.

The regional KMS 120A may include the logs 350 that log information about the managed keys such as key usage information (e.g., when a managed key was accessed, who accessed the managed key, how many times a key was accessed, the operation that was performed, etc.). The logs 350 may be transmitted to the KMS log 360 that is stored on the central KMS server 110. The central KMS server 110 may collect and analyze the logs received from the regional KMS 120A-B.

The R-KMS KLS 122A controls the execution of the functions of the regional KMS 120A including processing KLS queries. If the regional KMS 120 can answer a received KLS query (e.g., it has the KLS record stored or cached), the R-KMS KLS 122A responds to the KLS query with the KLS record information. If the regional KMS 120 does not have the information to answer the KLS query, the R-KMS KLS 122A transmits the KLS query to the central KMS server 110. The R-KMS KLS 122A causes the KLS records received from the central KMS server 110 (or from another device such as another regional KMS) to be stored in the KLS store 346.

Figure 4:
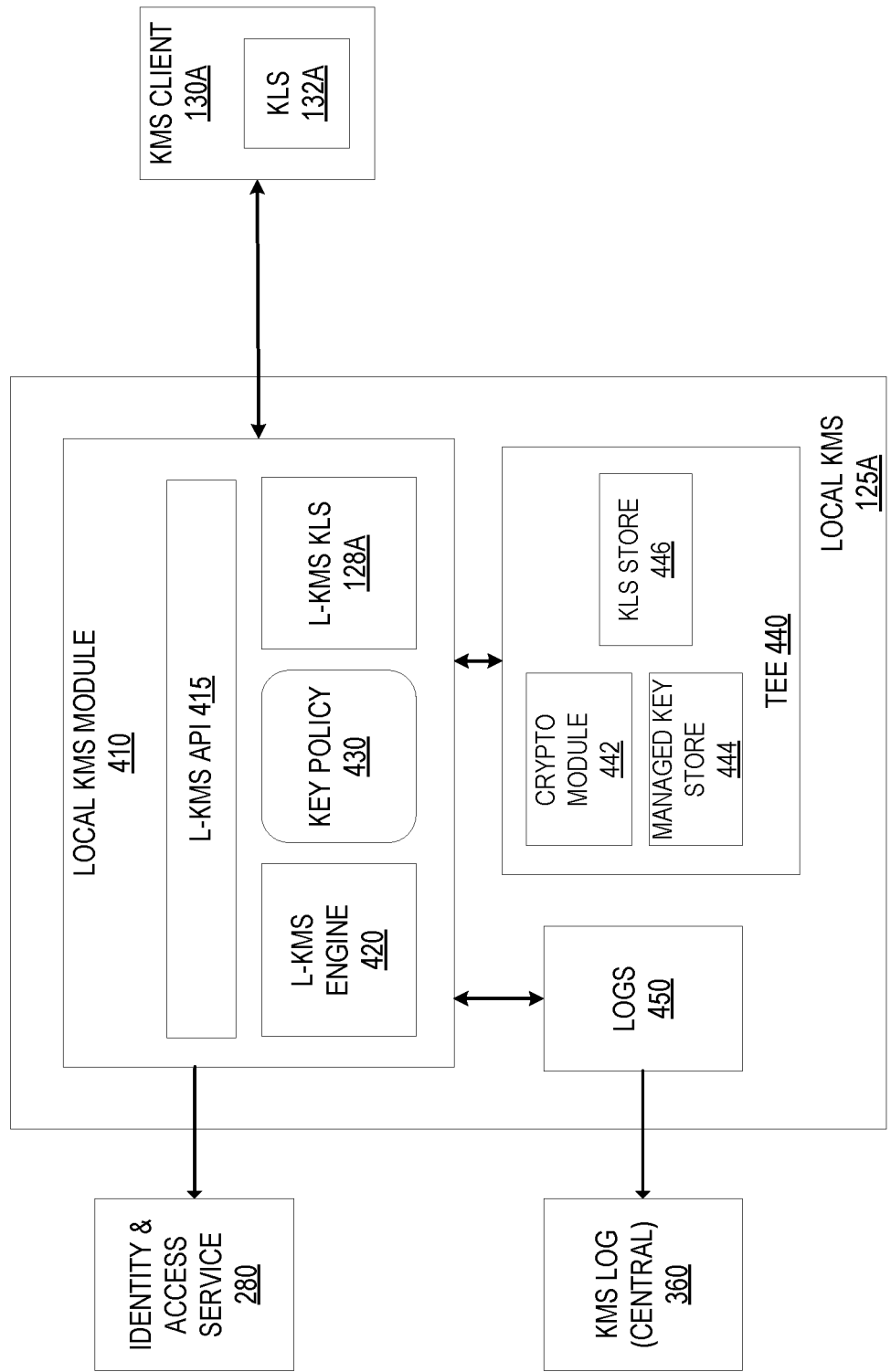
FIG. 4 shows an exemplary local KMS according to an embodiment.

FIG. 4 shows an exemplary local KMS 125A according to an embodiment. In an embodiment, the local KMS 125A is hosted on a system that includes a minimal set of kernel and userspace components required to support the functions of the local KMS 125A. The host system may use a hardware-based root-of-trust, Trusted Execution Environment (TEE). The local KMS 125A includes the local KMS module 410, the TEE 440, and the logs 450. The local KMS module 410 includes the L-KMS API 415, the L-KMS engine 420, the key policy 430, and the L-KMS KLS 128A.

The local KMS module 410 receives the replicated managed keys and associated policies from the regional KMS 120. The replicated managed keys are stored in the managed key store 444 of the TEE 440. The KLS records are stored in the KLS store 446. The key policy 430 is protected by a managed key stored in the managed key store 444 in the TEE 440. The key policy 430 can define fine-grained access control for using a managed key for a key operation based on one or more attributes including identity, IP address, and protocol. For example, an identity (e.g., a user, a group, an application) may be granted permission to use a managed key (e.g., encrypt, decrypt) with one or more optional conditions (e.g., protocol type, host IP address, location (e.g., host geographic location or region), time and/or date (e.g., time of the day, day of the week, date range). The TEE 440 also includes the cryptographic module 442 that performs cryptographic operations using a managed key stored in the managed key store 444.

The L-KMS API 415 provides an interface for KMS clients to use the features and services provided by the local KMS 125A. For example, the L-KMS API 415 provides an interface for cryptographic functions using managed keys such as encrypting, decrypting, signing, verifying, creating a data key, creating a data key pair, and/or generating a random number. The KMS client (e.g., the KMS client 130A) may use the L-KMS API 415 to make a KMS service request. The connection between the local KMS 125A and a KMS client may be over a secure connection (e.g., an mTLS connection). Further, the local KMS 125A and the KMS client may authenticate each other using HW rooted of trust.

The L-KMS engine 420 controls the execution of the functions of the local KMS 125A including and processing the KMS service requests received from a KMS client. If a KMS service request requires use of a managed key that is not locally available to the L-KMS engine 420 (e.g., the managed key is not included in the managed key store 444), the L-KMS engine 420 causes a query for the managed key and associated policy to be transmitted to a regional KMS 120. The managed key received from the regional KMS 120 is stored in the managed key store 444.

Processing a KMS service request may include enforcing the policy associated with the managed key that is necessary for the requested operation. For example, the L-KMS engine 420 checks a requested key action against a CMK policy to determine whether the requested action is permitted for the subject identity. To authenticate the subject identity, the L-KMS engine 420 may access the identity and access service 280 to authenticate the identity of the subject (e.g., a user, a group, an application, a system). If permitted, the L-KMS engine 420 causes the cryptographic module 442 to perform the requested cryptographic operation (e.g., encrypt, decrypt, sign, verify, create a data key, create a data key pair, generate a random number, etc.).

In an embodiment, the L-KMS engine 420 may cause a managed key and/or an associated policy to be transmitted to other local KMSs 125. Further, the L-KMS engine 420 may receive and install a managed key and/or associated policy received from another local KMS 125.

The local KMS 125A may include the logs 450 that log information about the managed keys such as key usage information (e.g., when a managed key was accessed, who accessed the managed key, how many times a key was accessed, the operation that was performed, etc.). The logs 450 may be transmitted to the KMS log 360 that is stored on the central KMS server 110. The central KMS server 110 may collect and analyze the logs received from the local KMS 125.

The L-KMS KLS 128A controls the execution of the functions of the local KMS 125A including processing KLS queries. If the local KMS 125A can answer a received KLS query (e.g., it has the KLS record stored or cached), the L-KMS KLS 128A responds to the KLS query with the KLS record information. If the local KMS 125A does not have the information to answer the KLS query, the L-KMS KLS 128A transmits the KLS query to a regional KMS 120. The L-KMS KLS 128A causes the KLS records received from the regional KMS 120 (or from another device such as another local KMS) to be stored in the KLS store 446.

Figure 5:
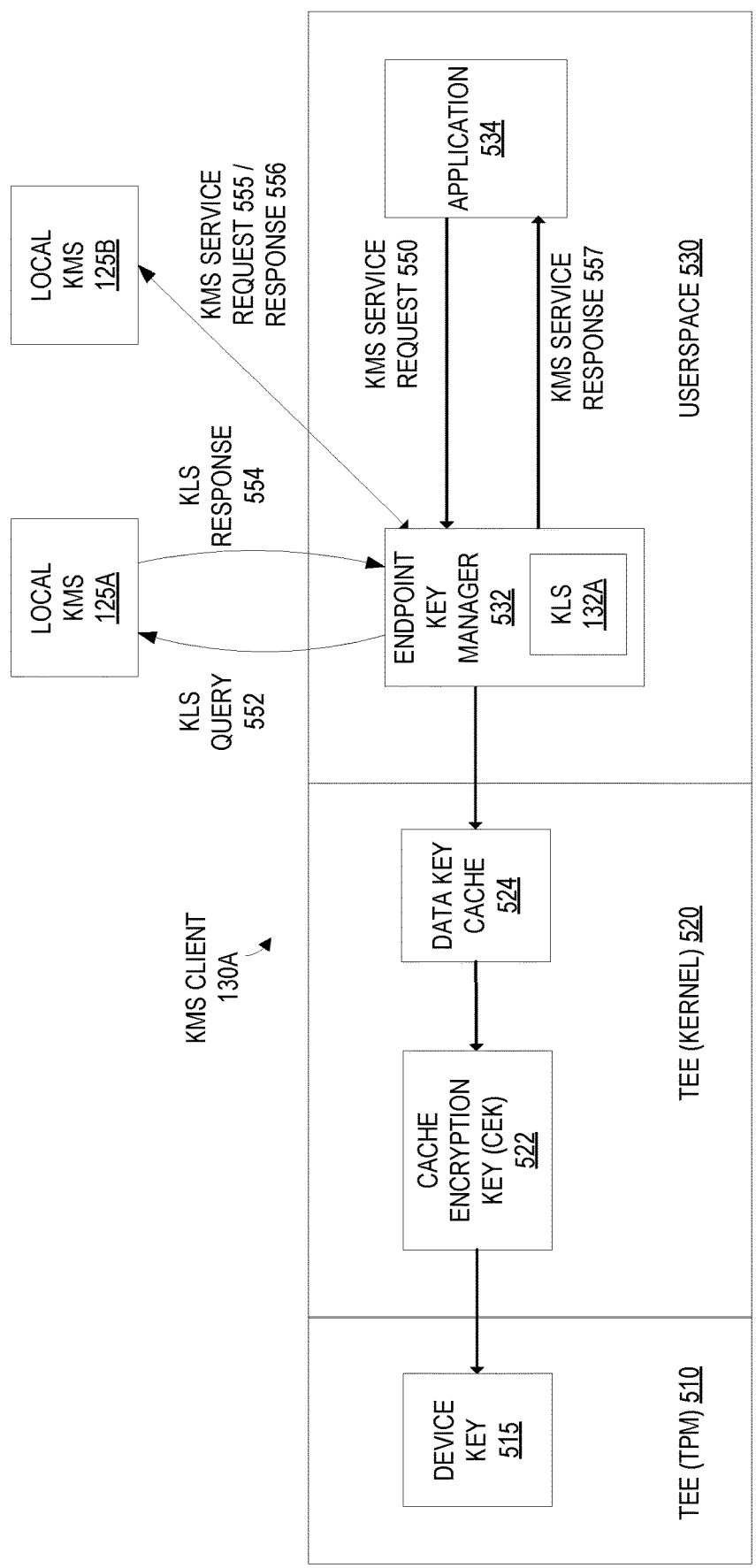
FIG. 5 shows an exemplary KMS client according to an embodiment.

FIG. 5 shows an exemplary KMS client 130A according to an embodiment. The KMS client 130A includes the TEE (TPM) 510, the TEE (kernel) 520, and the userspace 530. The application 534 runs in the userspace 530 and makes a KLS query given a specified key and/or key operation (e.g., given a key A, perform operation X with A).

The application 534 runs in the userspace 530 and makes requests for cryptographic operations (e.g., decrypt, encrypt, sign, verify). As illustrated in FIG. 5, the application 534 makes a KMS service request 550 that is received by the endpoint key manager 532. The endpoint key manager 532 is a userspace service that provides key management functions to local userspace applications such as the application 534. The endpoint key manager 532 also includes the KLS 132A to perform key lookup services. If the endpoint key manager 532 does not have access to the key and does not know the identity of a KMS that has the key operation, the endpoint key manager 532 may transmit a KLS query to one or more local KMSs. For example, if the KMS service request 550 is for unwrapping a data key, the endpoint key manager 532 checks the data key cache 524 for the data key. If not there, the endpoint key manager 532 can use the KLS 132A to check whether it has access to a KLS record for the identified key. If not, the endpoint key manager 532 transmits the KLS query 552 to the local KMS 125A. The local KMS 125A transmits a KLS response 554 to the KMS client 130A that includes the identity of one or more KMS servers that are each capable of performing the key operation with that managed key. In the example of FIG. 5, the KLS response 554 includes the identity of the local KMS 125B as a KMS that is capable of performing the key operation with that managed key. The endpoint key manager 532 transmits the KMS service request 555 to the identified KMS, which in this example is the local KMS 125B, and receives the KMS service response 556 from the local KMS 125B. The endpoint key manager 532 receives the KMS service response 556 and forwards the KMS service response 557 to the application 534. For example, if the request is to unwrap a data key, the endpoint key manager 532 transmits the data key to the application 534 and may store the data key in the data key cache 524. The endpoint key manager 532 may also cache the KLS record received in the KLS response 554.

The TEE (kernel) 520 includes the data key cache 524 that is encrypted by the cache encryption key (CEK) 522 that is protected by the device key 515 of the TPM 510. The CEK 522 may be randomly generated by the TPM 510 when the KMS client 130 boots. The data key cache 524 may be stored in kernel memory and encrypted by the CEK 522.

In an embodiment, a first KMS can proxy a KMS request or a key operation to a second KMS. This may occur for a variety of reasons including: the first KMS does not have or store the key to perform the operation; the first KMS does not have the required property(ies) for performing the operation (e.g., the first KMS does not meet the security bar required for performing the operation, the first KMS is not in an allowed location for performing the operation, etc.); the first KMS does not support the requested cryptographic operation; the second KMS can process the request faster even with a network delay; and/or for load balancing.

Figure 6:
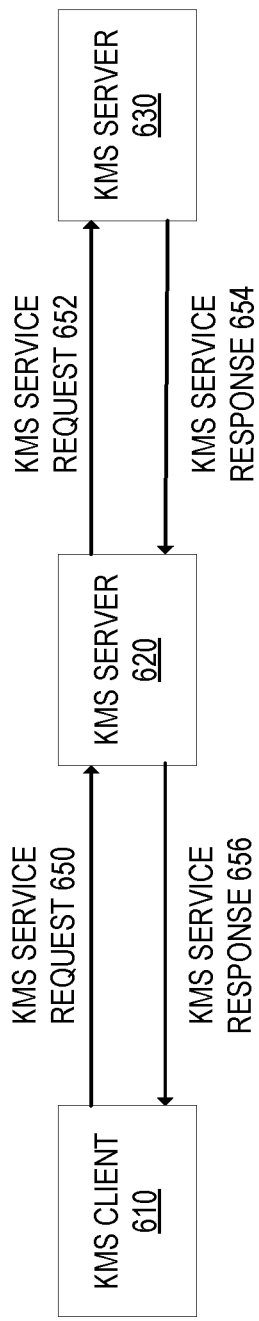
FIG. 6 shows an example of a first KMS proxying a KMS request or key operation to a second KMS according to an embodiment.

FIG. 6 shows an example of a first KMS server proxying a KMS request or key operation to a second KMS server according to an embodiment. In the example of FIG. 6, the first KMS server is the KMS server 620 and the second KMS server is the KMS server 630. The KMS server 620 and the KMS server 630 may be any combination of local KMS server(s) and regional KMS server(s). As an example, the KMS server 620 and the KMS server 630 may each be a local KMS server. As another example, the KMS server 620 may be a local KMS server and the KMS server 630 may be a regional KMS server. As another example, the KMS server 620 and the KMS server 630 may each be a regional KMS server.

The KMS client 610 transmits a KMS service request 650 to the KMS server 620. The KMS server 620 determines to proxy the request or operation to the KMS server 630. As described above, the determination to proxy the request or operation may be because the KMS server 620 does not have or store the key to perform the operation; the KMS server 620 does not have the required property(ies) for performing the operation (e.g., the KMS server 620 does not meet the security bar required for performing the operation, the KMS server 620 is not in an allowed location for performing the operation, etc.); the KMS server 620 does not support the requested cryptographic operation; the KMS server 630 can process the request faster even with a network delay; and/or for load balancing. The KMS server 620 transmits the KMS service request 652 to the KMS server 630. The KMS server 630 processes the KMS service request (or in some cases may itself proxy to another KMS server). The KMS 630 transmits a KMS service response 654 to the KMS server 620. The KMS server 620 transmits the KMS service response 656 to the KMS client 610.

In one example, the first KMS server may perform some key operations and proxy other key operations to the second KMS server. For example, if the key operation is for unwrapping a data key, the first KMS server performs the operation, but if the key operation is for unwrapping an application key, the first KMS server proxies the key operation to be performed by the second KMS server. As another example, the first KMS server may perform a key operation for signature generation and the first KMS server proxies a key operation for unwrapping an application key.

Figure 7:
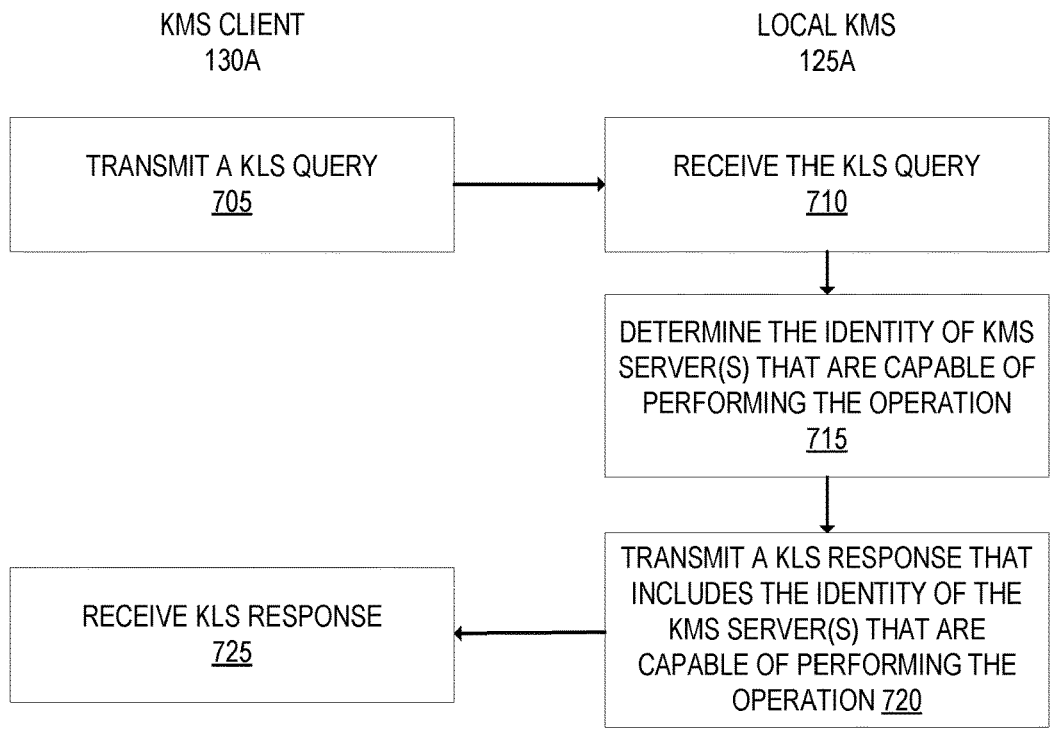
FIG. 7 is a flow diagram that illustrates exemplary operations for performing a key lookup service according to an embodiment.

FIG. 7 is a flow diagram that illustrates exemplary operations for performing a key lookup service according to an embodiment. At operation 705, the KMS client 130A transmits a KLS query that is received, at operation 710, by an intermediate KMS server (the local KMS 125A in this example). The KLS query is to determine an identity of one or more KMS servers that are capable of performing a key operation with a managed key. The KLS query identifies the key that is requested. The KLS query can also identify the key operation that is to be performed using the identified key (e.g., encrypt, decrypt, sign, verify). The KLS query can also include an identifier of a user and/or system making the request and may include credentials (e.g., password).

Next, at operation 715, the intermediate KMS server determines the identity of one or more KMS servers that are capable of performing the operation with the managed key. If the intermediate KMS server does not have information locally (e.g., local KLS record(s)) to answer the KLS query, the intermediate KMS server may transmit the KLS query to another KMS intermediate server or to the central KMS server and receive a KLS response. The intermediate KMS server may store or cache the received KLS response. If the intermediate KMS server includes information to answer the KLS query, the intermediate KMS server can answer the KLS query without further querying another KMS server.

In an embodiment, as part of determining the identity of KMS server(s) that are capable of performing the identified operation with the identified key, the intermediate server may determine whether the identified operation with the identified key is permitted to be performed. For instance, the KLS record for the identified key may include, or be associated with, an access policy that defines access based on one or more attributes including identity, IP address, and protocol. For example, an identity (e.g., a user, a group, an application) may be granted permission to use a managed key (e.g., encrypt, decrypt) with one or more optional conditions (e.g., protocol type, host IP address, location (e.g., host geographic location or region), time and/or date (e.g., time of the day, day of the week, date range).

If there are no KMS servers that are capable of performing the identified operation with the identified key, an error message may be returned to the KMS client. In the example of FIG. 7, however, a KMS server that is capable of performing the identified operation with the identified key is determined.

At operation 720, the intermediate KMS server transmits a KLS response in response to the KLS query that includes the identity of one or more KMS servers that are capable of performing the identified operation with the identified key, which is received by the KMS client 130A at operation 725. This intermediate KMS server may or may not be included as one of the identified KMS servers in the KLS response. The KLS response can identify the KMS server(s) with an IP address and/or URL. The KLS response may rank the KMS servers based on an estimated response/transaction time. This intermediate KMS server may or may not be identified in the KLS response.

Figure 8:
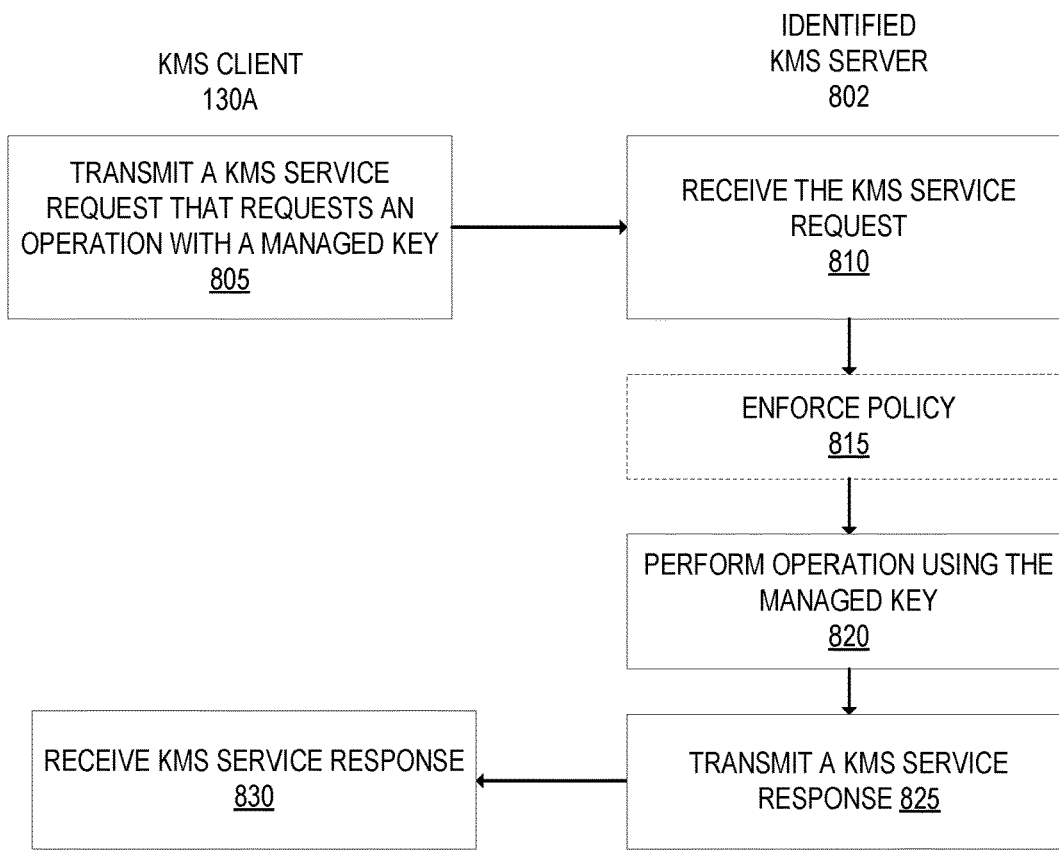
FIG. 8 is a flow diagram that illustrates exemplary operations for processing a key service request according to an embodiment.

FIG. 8 is a flow diagram that illustrates exemplary operations for processing a key service request according to an embodiment. The operations of FIG. 8 are performed after a KMS client receives a KLS response that identifies one or more KMS servers that are capable of performing the identified operation with the identified key.

At operation 805, the KMS client 130A transmits a KMS service request that requests an operation with a managed key, that is received by an intermediate KMS server at operation 810. In the example of FIG. 8, this intermediate KMS server is referred to as the identified KMS server 802 because it is included in the KLS response to the KLS query. The identified KMS server 802 may be a local KMS or a regional KMS. The KMS service request may be a request to unwrap a data key (decrypt an encrypted data key), encrypt a data key, sign a message, verify a signed message, create a data key, create a data key pair, and/or generate a random number. The KMS service request may include a key identifier that identifies the managed key, the operation requested, and a subject identifier that identifies the subject identity associated with the KMS service request. The key identifier identifies the managed key and is associated with the policy for the managed key. The request may also include a credential of the subject identity. The KMS service request may also include additional information used to validate the subject identity and/or the request such as host information (e.g., IP address, OS version, patch status, device posture, etc.).

It is possible that the KLS response identifies multiple intermediate KMS servers that are capable of performing the identified operation with the identified key. In such a case, the KMS client 130A may transmit the KMS service request to one or more of these identified KMS servers. For example, the KMS client 130A may transmit the KMS service request to a first identified intermediate KMS server (e.g., the one that is ranked best based on estimated response/transaction time) and if it does not respond, or is slow to respond (e.g., it does not respond with a period), the KMS client 130A can transmit the KMS service request to a second identified intermediate KMS server. As another example, the KMS client 130A may transmit the KMS service request to each identified KMS server and use the result that it receives first.

At operation 815, which may not be performed in all embodiments, the identified KMS server 802 enforces the policy associated with the managed key. For example, the identified KMS server 802 may determine whether the requested key action is permitted for the subject identity as defined by the policy. To authenticate the subject identity, the identified KMS server 802 may access the identity and access service 280 to authenticate the identity of the subject (e.g., a user, a group, an application, a system). If permitted, then at operation 820 the identified KMS server 802 performs the identified operation with the managed key (e.g., encrypt, decrypt, sign, verify, create a data key, create a data key pair, generate a random number, etc.). At operation 825, the identified KMS server 802 transmits a KMS service response to the KMS client 130A which receives the response at operation 830. The KMS service response includes the result of processing the KMS service request. For example, if the request is to unwrap a data key, the response includes the unwrapped data key.

Embodiments have been described where the KMS client performs a KLS lookup (e.g., transmits a KLS query and receives a KLS response). In another embodiment, the KMS client does not itself perform a KLS lookup. In such an embodiment, the KMS client may transmit a KMS service request to a local KMS server and that local KMS server performs the KLS lookup. For example, that local KMS server transmits a KLS query and receives a KLS response. If that local KMS server can perform the identified operation with the identified key, that local KMS server performs the operation and returns a KMS service response to the KMS client. If that local KMS server is not capable or permitted to perform the identified operation with the identified key, the local KMS server may proxy the KMS service request to a KMS server identified in the KLS response and proxy the KMS service response to the KMS client. Alternatively, if that local KMS server is not capable or permitted to perform the identified operation with the identified key, that local KMS server may cause the KMS client to redirect the KMS service request to a KMS identified in the KLS response.

Embodiments have been described where the KMS servers provide KLS functionality including storing the KLS records used for lookup. In another embodiment, the KLS functionality is provided by a different set of servers. In such an embodiment, a KMS client and/or a KMS server may transmit a KLS query that is received by a KLS server that responds to the query with a KLS response. Such a KLS server can be part of a KLS system that includes multiple KLS servers possibly in a hierarchy. The KLS query and KLS response in such an embodiment can be like the KLS query and KLS response described elsewhere herein.

Figure 9:
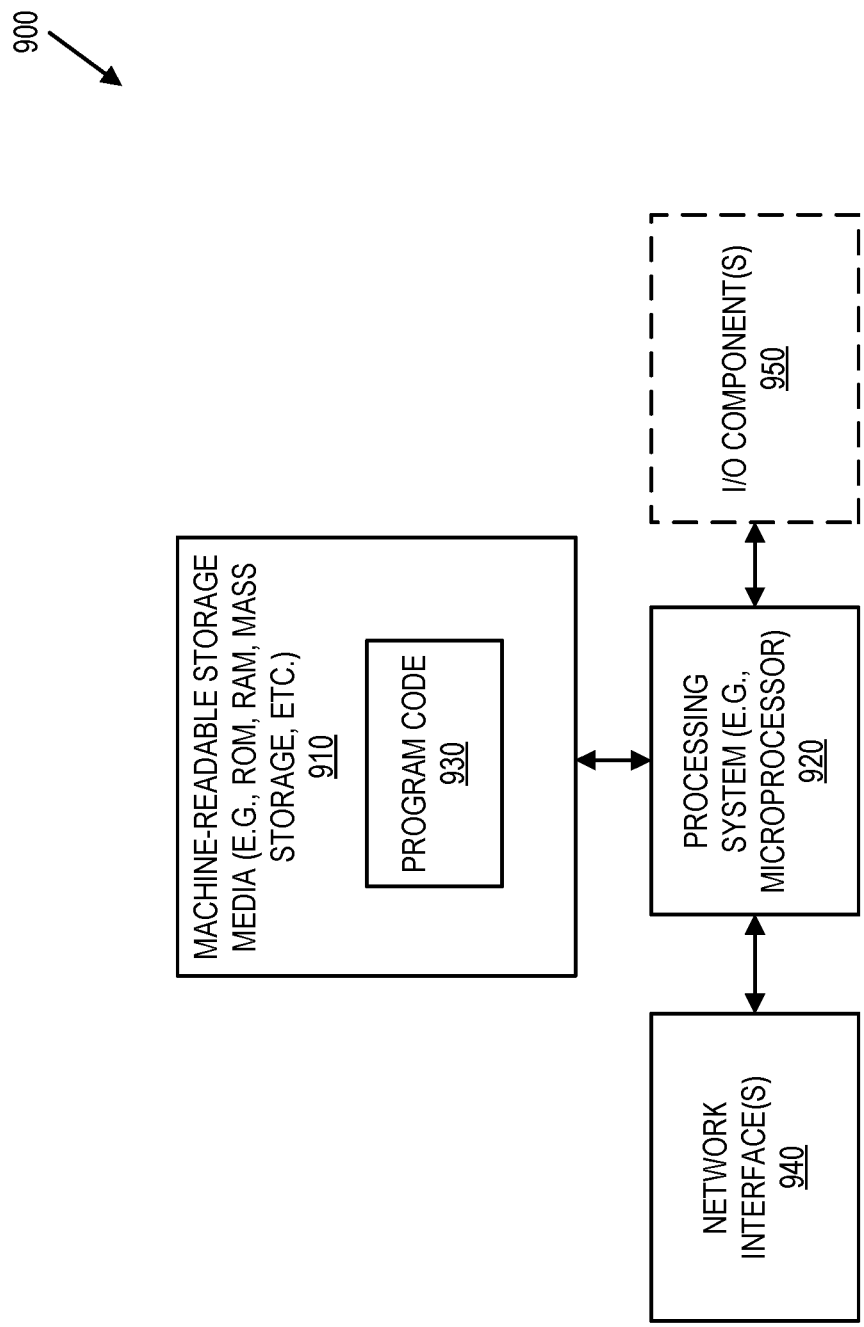
FIG. 9 is a block diagram illustrating a data processing system that can be used in an embodiment.

FIG. 9 illustrates a block diagram for an exemplary data processing system 900 that may be used in some embodiments. One or more such data processing systems 900 may be utilized to implement the embodiments and operations described with respect to the central KMS, service KMS, and/or KMS client. Data processing system 900 includes a processing system 920 (e.g., one or more processors and connected system components such as multiple connected chips). The data processing system 900 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 910 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 920. For example, the depicted machine-readable storage media 910 may store program code 930 that, when executed by the processing system 920, causes the data processing system 900 to execute the operations described for the central KMS, service KMS, and/or the KMS client.

The data processing system 900 also includes one or more network interfaces 940 (e.g., a wired and/or wireless interfaces) that allows the data processing system 900 to transmit data and receive data from other computing devices, typically across one or more networks (e.g., Local Area Networks (LANs), the Internet, etc.). The data processing system 900 may also include one or more input or output ("I/O") components 950 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 900, and, in certain embodiments, fewer components than that shown in One or more buses may be used to interconnect the various components shown in FIG. 8.

The techniques shown in the figures can be implemented using code and data stored and executed on one or more electronic devices (e.g., a central KMS, a service KMS, a KMS client). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

In the preceding description, numerous specific details are set forth to provide a more thorough understanding of embodiments. However, embodiments may be practiced without such specific details. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

While the flow diagrams in the figures show a particular order of operations performed by certain embodiments, such order is exemplary (e.g., alternative embodiments may perform the operations in a different order, combine certain operations, overlap certain operations, etc.).

While the invention has been described in terms of several embodiments, the invention is not limited to the embodiments described, can be practiced with modification and alteration within the spirit and scope of the appended claims. The description is thus to be regarded as illustrative instead of limiting.

What is claimed is:

1. A method, comprising:
    receiving, at a first intermediate key management system (KMS) server of a distributed KMS, a KMS service request from a KMS client for performing managed key operations, wherein the first intermediate KMS server receives the KMS service request in response to a key lookup service (KLS) query process that determined the first intermediate KMS server is one of one or more of a plurality of KMS servers that are capable of performing the managed key operations;
    performing, at the first intermediate KMS server, a first operation of the managed key operations using a first managed key;
    proxying, by the first intermediate KMS server to a second intermediate KMS server, a second operation of the managed key operations using the first managed key, wherein the first intermediate KMS server is not one of the one or more of the plurality of KMS servers that are capable of performing the second operation with the first managed key, and wherein the second intermediate KMS server is one of the one or more of the plurality of KMS servers that are capable of performing the second operation with the first managed key; and
    transmitting, from the first intermediate KMS server to the KMS client, a KMS service response to the KMS service request that includes results of the first operation performed by the first intermediate KMS server and the second operation performed by the second intermediate KMS server.

2. The method of claim 1, further comprising:
    determining a ranking that denotes an estimated response and/or transaction time among the one or more of the plurality of KMS servers that are capable of performing the second operation with the first managed key;
    determining, from the ranking, that the second intermediate KMS server can performs the second operation faster than the first intermediate KMS server; and
    selecting the second intermediate KMS server to perform the second operation.

3. The method of claim 1, wherein the first operation performed by the first intermediate KMS server is a signature generation, and wherein the second operation performed by the second intermediate KMS server is to decrypt an encrypted application key.

4. The method of claim 1, further comprising:
    determining first supported capabilities of the first intermediate KMS server do not support the second operation; and
    selecting the second intermediate KMS server to perform the second operation based on determining the first supported capabilities of the first intermediate KMS server do not support the second operation and second supported capabilities of the second intermediate KMS server do support the second operation.

5. The method of claim 4, wherein the first intermediate KMS server does not meet a security bar for performing the second operation.

6. The method of claim 4, wherein the second intermediate KMS server is in an allowed location for performing the second operation.

7. The method of claim 1, further comprising:
    receiving, at the first intermediate KMS server, a second KMS service request from a second KMS client for performing second managed key operations using a second managed key;
    determining, using a key lookup service (KLS) query, an identity of one or more of the plurality of KMS servers that are capable of performing the second managed key operations with the second managed key;
    proxying the second KMS service request to a third intermediate KMS server that is capable of performing the second managed key operations with the second managed key;
    receiving, by the first intermediate KMS server, a second KMS service response from the third intermediate KMS server that includes a result of the performed second managed key operations using the second managed key; and
    transmitting the second KLS response to the second KMS client.

8. A non-transitory machine-readable storage medium that provides instructions that, when executed by a processor, cause operations to be performed comprising:
    receiving, at a first intermediate key management system (KMS) server of a distributed KMS, a KMS service request from a KMS client for performing managed key operations, wherein the first intermediate KMS server receives the KMS service request in response to a key lookup service (KLS) query process that determined the first intermediate KMS server is one of one or more of a plurality of KMS servers that are capable of performing the managed key operations;
    performing, at the first intermediate KMS server, a first operation of the managed key operations using a first managed key;
    proxying, by the first intermediate KMS server to a second intermediate KMS server, a second operation of the managed key operations using the first managed key, wherein the first intermediate KMS server is not one of the one or more of the plurality of KMS servers that are capable of performing the second operation with the first managed key, and wherein the second intermediate KMS server is one of the one or more of the plurality of KMS servers that are capable of performing the second operation with the first managed key; and
    transmitting, from the first intermediate KMS server to the KMS client, a KMS service response to the KMS service request that includes results of the first operation performed by the first intermediate KMS server and the second operation performed by the second intermediate KMS server.

9. The non-transitory machine-readable storage medium of claim 8, wherein the operations further comprise:
    determining a ranking that denotes an estimated response and/or transaction time among the one or more of the plurality of KMS servers that are capable of performing the second operation with the first managed key;

determining, from the ranking, that the second intermediate KMS server can performs the second operation faster than the first intermediate KMS server; and selecting the second intermediate KMS server to perform the second operation.

10. The non-transitory machine-readable storage medium of claim 8, wherein the first operation performed by the first intermediate KMS server is a signature generation, and wherein the second operation performed by the second intermediate KMS server is to decrypt an encrypted application key.

11. The non-transitory machine-readable storage medium of claim 8, wherein the operations further comprise:
determining first supported capabilities of the first intermediate KMS server do not support the second operation; and
selecting the second intermediate KMS server to perform the second operation based on determining the first supported capabilities of the first intermediate KMS server do not support the second operation and second supported capabilities of the second intermediate KMS server do support the second operation.

12. The non-transitory machine-readable storage medium of claim 11, wherein the first intermediate KMS server does not meet a security bar for performing the second operation.

13. The non-transitory machine-readable storage medium of claim 11, wherein the second intermediate KMS server is in an allowed location for performing the second operation.

14. The non-transitory machine-readable storage medium of claim 8, further comprising:
receiving, at the first intermediate KMS server, a second KMS service request from a second KMS client for performing second managed key operations using a second managed key;
determining, using a key lookup service (KLS) query, an identity of one or more of the plurality of KMS servers that are capable of performing the second managed key operations with the second managed key;
proxying the second KMS service request to a third intermediate KMS server that is capable of performing the second managed key operations with the second managed key;
receiving, by the first intermediate KMS server, a second KMS service response from the third intermediate KMS server that includes a result of the performed second managed key operations using the second managed key; and
transmitting the second KLS response to the second KMS client.

15. A first intermediate key management system (KMS) server of a plurality of intermediate KMS servers of a distributed KMS, comprising:
a processor; and
a non-transitory machine-readable storage medium that provides instructions that, if executed by the processor, will cause the first intermediate KMS server to carry out operations including:
receiving, at the first intermediate KMS server, a KMS service request from a KMS client for performing managed key operations, wherein the first intermediate KMS server receives the KMS service request in response to a key lookup service (KLS) query process that determined the first intermediate KMS server is one of one or more of a plurality of KMS servers that are capable of performing the managed key operations;
performing, at the first intermediate KMS server, a first operation of the managed key operations using a first managed key;
proxying, by the first intermediate KMS server to a second intermediate KMS server, a second operation of the managed key operations using the first managed key, wherein the first intermediate KMS server is not one of the one or more of the plurality of KMS servers that are capable of performing the second operation with the first managed key, and wherein the second intermediate KMS server is one of the one or more of the plurality of KMS servers that are capable of performing the second operation with the first managed key; and
transmitting, from the first intermediate KMS server to the KMS client, a KMS service response to the KMS service request that includes results of the first operation performed by the first intermediate KMS server and the second operation performed by the second intermediate KMS server.

16. The first intermediate KMS server of claim 15, wherein the operations further comprise:
determining a ranking that denotes an estimated response and/or transaction time among the one or more of the plurality of KMS servers that are capable of performing the second operation with the first managed key;
determining, from the ranking, that the second intermediate KMS server can performs the second operation faster than the first intermediate KMS server; and
selecting the second intermediate KMS server to perform the second operation.

17. The first intermediate KMS server of claim 15, wherein the first operation performed by the first intermediate KMS server is a signature generation, and wherein the second operation performed by the second intermediate KMS server is to decrypt an encrypted application key.

18. The first intermediate KMS server of claim 15, wherein the operations further comprise:
determining first supported capabilities of the first intermediate KMS server do not support the second operation; and
selecting the second intermediate KMS server to perform the second operation based on determining the first supported capabilities of the first intermediate KMS server do not support the second operation and second supported capabilities of the second intermediate KMS server do support the second operation.

19. The first intermediate KMS server of claim 18, wherein the first intermediate KMS server does not meet a security bar for performing the second operation.

20. The first intermediate KMS server of claim 18, wherein the second intermediate KMS server is in an allowed location for performing the second operation.

21. The first intermediate KMS server of claim 15, further comprising:
receiving a second KMS service request from a second KMS client for performing second managed key operations using a second managed key;
determining, using a key lookup service (KLS) query, an identity of one or more of the plurality of KMS servers that are capable of performing the second managed key operations with the second managed key;
proxying the second KMS service request to a third intermediate KMS server that is capable of performing the second managed key operations with the second managed key;

receiving a second KMS service response from the third intermediate KMS server that includes a result of the performed second managed key operations using the second managed key; and transmitting the second KLS response to the second KMS client.

* * * * *